United States Patent [19]
Mills

[11] Patent Number: 5,168,359
[45] Date of Patent: Dec. 1, 1992

[54] VIDEO SCAN RATE CONVERSION METHOD AND APPARATUS FOR ACHIEVING SAME

[75] Inventor: George T. Mills, Ridgecrest, Calif.

[73] Assignee: The United States of America as represented by the Secretary of the Navy, Arlington, Va.

[21] Appl. No.: 742,235

[22] Filed: Aug. 1, 1991

[51] Int. Cl.$^5$ .............................................. H04N 7/01
[52] U.S. Cl. .................................... 358/140; 358/160
[58] Field of Search ............. 358/140, 138, 160, 21 R, 358/451

[56] References Cited

U.S. PATENT DOCUMENTS

| | | | |
|---|---|---|---|
| 4,623,922 | 11/1986 | Wischermann | 358/21 R X |
| 4,694,337 | 9/1987 | Lyons | 358/140 |
| 4,766,494 | 8/1988 | Doyle | 358/140 |
| 5,008,752 | 4/1991 | Van Nostrand | 358/451 X |
| 5,097,518 | 3/1992 | Scott et al. | 358/451 X |

Primary Examiner—Victor R. Kostak
Attorney, Agent, or Firm—Harvey A. Gilbert; Melvin J. Sliwka; John L. Forrest, Jr.

[57] ABSTRACT

In a video system, a video signal operates at a vertical scan rate to generate a first video frame characterized by a first number of lines per frame. A method and apparatus are provided to convert the first video frame into a second video frame characterized by a second number of lines per frame. The first video frame is stored at the vertical scan rate as digital samples. A portion of the stored digital samples from each line of the first video frame are retrieved at the vertical scan rate. The number of digital samples in the retrieved portion from each line of the first video frame is governed by a ratio equal to the second number divided by the first number, such that the retrieved portion from the first video frame is the second video frame.

12 Claims, 4 Drawing Sheets

VIDEO SCAN RATE CONVERSION METHOD AND APPARATUS FOR ACHIEVING SAME

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to video scan rate conversion and more particularly to a method and apparatus for video scan rate conversion that converts a first video frame into a second video frame having fewer lines per frame than the first video frame.

BACKGROUND OF THE INVENTION

Easily the most widely used video display in the United States is based on a video frame having a 525 line raster. Such displays are found in almost every American home and business in the form of televisions and VCR monitors. However, there exist certain video applications that use a display based on a video frame having more than 525 lines per frame in order to achieve greater resolution.

For example, military aircraft use cockpit video display formats that are based on both 675 and 875 lines per frame. During testing of the aircraft, it is desirable to transmit the information displayed in the aircraft to a ground station for real-time evaluation. Since the ground station locations typically use conventional 525 line video displays, it is desirable to convert the aircraft's video frame to the standard 525 line video frame. In other applications, such as medical instrumentation, high resolution video is often used. However, review of the video cannot be performed without special (and usually expensive) monitors. Accordingly, there exists a similar conversion need to allow the use of conventional monitors.

Prior art scan rate converters, as they are called, are available to generate a 525 line video frame from a video frame characterized by a greater number of lines. Their design approach is to digitally store the video signal and to retrieve whole lines of the stored data to generate the output video signal based on 525 lines per frame. Accordingly, entire lines of the stored signal are randomly skipped or in some cases, blocks of lines such as the bottom of the picture are skipped in order to generate the 525 line video frame. Typically, this results in discarding complete sections of the original video frame which may contain critical test data. It would, however, be desirable if the conversion process merely decreased the resolution of the video frame to the resolution normally associated with 525 line video.

SUMMARY OF THE INVENTION

Accordingly, it is an object of the present invention to provide a method and apparatus that converts a video frame based on a higher number of lines per frame to a video frame based on a lower number of lines per frame.

Another object of the present invention is to provide a method and apparatus that converts a high resolution video frame to a standard video frame based on 525 lines per frame.

Still another object of the present invention is to provide a method and apparatus that converts a higher resolution video frame to a lower resolution video frame while still retaining the essence of all data displayed by the higher resolution video frame.

Other objects and advantages of the present invention will become more obvious hereinafter in the specification and drawings.

In a video system, a video signal operates at originating vertical and originating horizontal scan rates to generate a first video frame characterized by a first number of lines per frame. A method and apparatus are provided to convert the first video frame into a second video frame characterized by a second number of lines per frame whenever the first number is greater than the second number. The first video frame is stored as digital samples such that each sample has a line and column address to indicate a particular line and column within the first video frame. A portion of the stored digital samples are retrieved from each line of the first video frame based on the originating vertical scan rate and a reduced horizontal scan rate. The reduced horizontal scan rate is a fractional percentage of the originating horizontal scan rate equal to the second number divided by the first number. The retrieved portion from the first video frame is the second video frame.

BRIEF DESCRIPTION OF THE DRAWINGS

FIG. 1 is an 875 line video frame shown in its sampled, matrix form;

FIG. 2 shows five lines of the 875 line video frame to be converted by the method of the present invention;

FIG. 3 shows the retrieved portion of the five lines of FIG. 2;

DETAILED DESCRIPTION OF THE INVENTION

Figure 4:
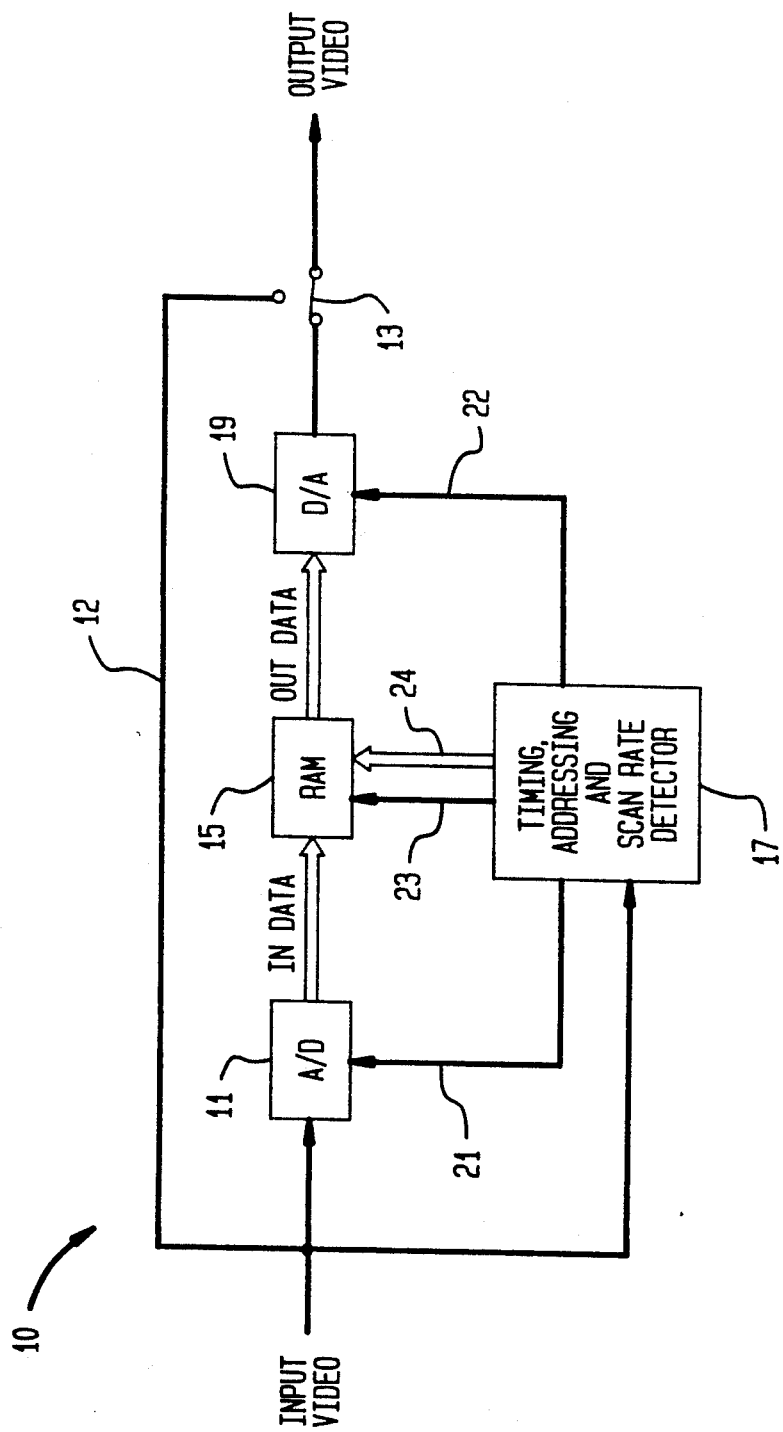
FIG. 4 is a block diagram of an apparatus used to implement the method of the present invention.

In order to facilitate an understanding of the method and apparatus of the present invention, the conversion of a video signal based on an 875 line video frame to a video signal based on a 525 line video frame will now be described without consideration for the frame consisting of two interlaced fields. However, it is to be understood at the outset that the method and apparatus of the present invention applies equally as well to any greater (amount of lines) to lesser (amount of lines) video frame conversion regardless of whether or not fields are interlaced so long as both videos use identical vertical scan rates.

The method of the present invention essentially involves storing each of the 875 line video frames and then rescanning each of the stored 875 line video frames at the 525 line rate. In other words, the ratio of output line rate/input line rate or 525/875=3/5, indicates that for every 5 lines of the 875 line video frame, 3 lines of the 525 line video frame must be generated. If 3 lines can be generated from every 5 lines without skipping whole lines, the method will generate a 525 line video frame that retains the essence of the information stored in the 875 line video frame.

Figures 1, 2, 3:
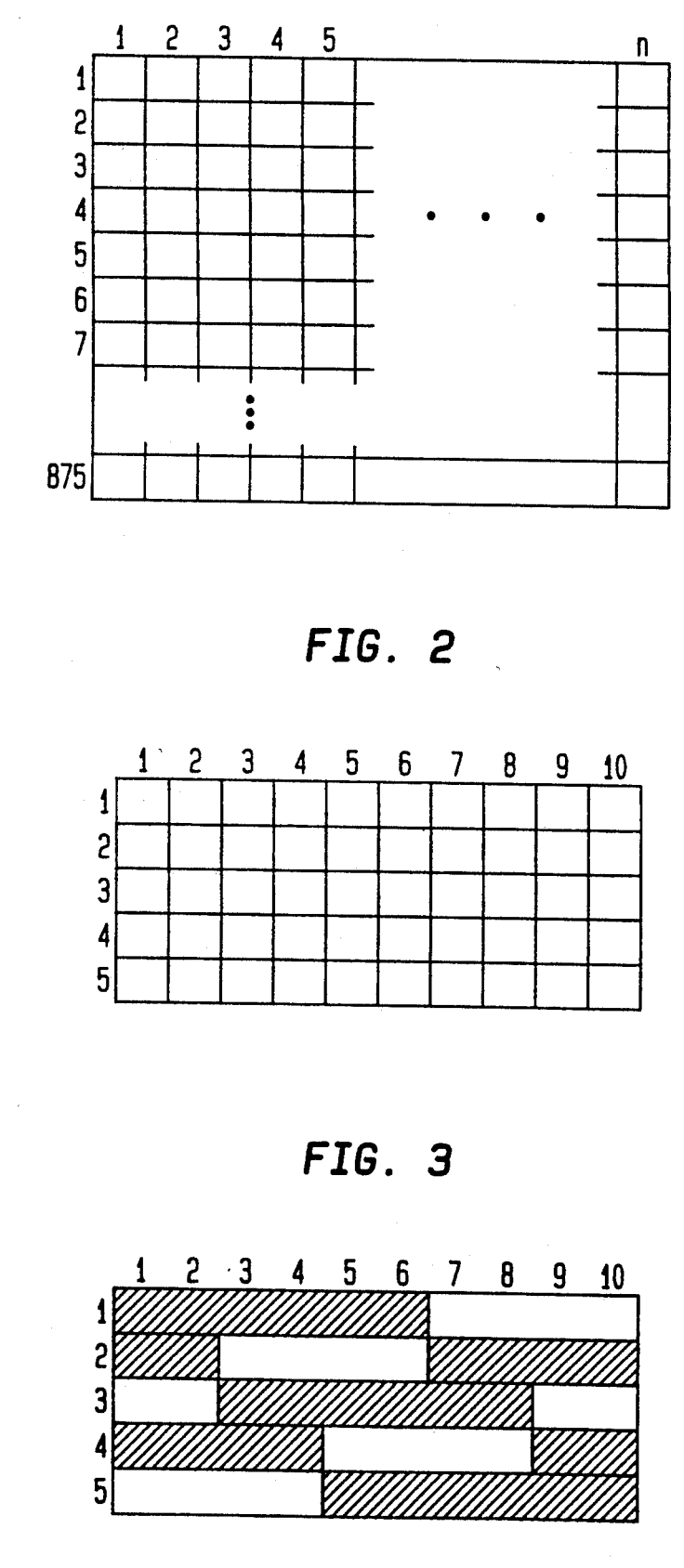

Referring now to the drawings, and in particular to FIG. 1, an 875 line video frame is shown in matrix form as it would be stored digitally in a memory. The 875 line video frame is generated according to vertical and horizontal scan rates. The 875 line video frame thus has 875 lines and n columns where n is a sampling rate chosen to be larger than the number of pixels associated with a line of the video frame. The choice of n must also be such to preclude any impact on the leading edge of the sync pulses. Accordingly, each digital sample from each line can be assigned a line and column address indicative of its position in the matrix (memory).

Since the 875 line video frame and the 525 line video frame will be defined to have the same field/frame per second format (e.g., 60 field/30 frame), the vertical scan times must be equal for both the 875 and 525 line video frames. Thus, only the horizontal scan rate can vary when the 875 line video frame is rescanned to produce a 525 line video frame. Accordingly, the horizontal scan rate is reduced by the ratio of the output line rate/input line rate which, for the illustrative example, is 3/5. In this way, 3/5 of each line of the 875 line video frame is used to generate the 525 line video frame as will now be described by way of example with reference to FIGS. 2 and 3.

In FIG. 2, 5 lines of the 875 line video frame are shown at a sampling rate of n=10. Note that the sampling rate of n=10 is chosen only to facilitate the description. Recalling that the vertical scan rates must be equal for both input and output video frames, a line counter will increment from 1 to 5 at the vertical scan rate during the rescanning process. However, a horizontal counter, while incrementing from 1 to 10, will do so at a rate reduced by 3/5 of the original horizontal scan rate. Specifically, when the line counter is set at 1, the horizontal counter will increment from 1 to 6 at which point the line counter will increment to line number 2. Thus, only 6 of the 10 samples are retrieved from line number 1 of the 875 line video frame to form the 525 line video. Samples 7 through 10 of line number 1 of the 875 line video frame are skipped. However, line number 1 of the 525 line video is completed with samples 7 through 10 from line number 2 of the 875 line video. By allowing the vertical scan rate to control the line counter and operating the horizontal counter at a reduced scan rate (i.e. 3/5), 3/5 of the samples from each line are retrieved while 2/5 of the samples from each line are skipped. The line counter to horizontal counter correspondence for this particular example is summarized in Table 1 below.

TABLE 1

| Line Counter | Horizontal Counter |
| --- | --- |
| 1 | 1,2,3,4,5,6 |
| 2 | 7,8,9,10,1,2 |
| 3 | 3,4,5,6,7,8 |
| 4 | 9,10,1,2,3,4 |
| 5 | 5,6,7,8,9,10 |

The rescanned or retrieved portion of the 875 line video frame of FIG. 2 is the hatched portion shown in FIG. 3. Line-by-line correspondence between the 875 line video frame and the 525 line video frame is summarized in TABLE 2 below.

TABLE 2

| Line Number of 525 line video frame | Line Number/Samples from 875 line video frame |
| --- | --- |
| 1 | line 1, samples 1–6 |
|   | line 2, samples 7–10 |
| 2 | line 2, samples 1–2 |
|   | line 3, samples 3–8 |
|   | line 4, samples 9–10 |
| 3 | line 4, samples 1–4 |
|   | line 5, samples 6–10 |

Thus, the retrieved portion of the 875 line video frame is equivalent to rescanning the 875 line video frame at the 525 line rate. In this way, the essence of the information contained in the 875 line video frame is retained and is equivalent to scanning the original picture at the 525 line rate.

It is to be understood that the storing and retrieving process described above can be achieved by a variety of means. However, for purposes of description, a preferred embodiment apparatus for carrying out this process is shown in FIG. 4, and is indicated generally by reference numeral 10. Since apparatus 10 is designed to be easily added to existing equipment, it must first be determined if the incoming video signal is to be converted to the 525 line rate. Accordingly, a timing, addressing and scan rate detector means (TAS) 17 receives the input video signal. In the typical TAS 17, the vertical and composite sync pulses will be extracted from the incoming video signal. The number of composite sync pulses between the vertical sync pulses is indicative of the number of lines per frame associated with the incoming video signal. If the incoming video signal is characterized as a 525 line video frame, no conversion is necessary and the input video signal is passed over bypass line 12 via switch 13 to become the output video thereby bypassing the conversion process. If, however, the incoming rate is greater than the 525 line rate (e.g., the 875 line rate) then the incoming video signal is processed by the scan converter of the present invention as will now be described.

In particular, an analog-to-digital (A/D) converter 11 samples the incoming video signal at a rate dictated by an input clock 21 generated by TAS 17. The sampled video signal is stored in a random access memory (RAM) 15. TAS 17 provides clock and address signals to the RAM 15 via clock line 23 and address lines 24, respectively. The clock and address signals are used to store the incoming video signal as a video frame according to the vertical and horizontal rates associated with the incoming video signal. Thus, the stored video frame may be thought of as the matrix described above with reference to FIG. 1.

TAS 17 is also used to control the retrieval of the stored video frame. Specifically, retrieval is accomplished by incrementing a line address counter at the vertical scan rate while incrementing a column address counter at the reduced horizontal scan rate as described above. The retrieved portion of each video frame is then passed through a digital-to-analog (D/A) converter 19 under the control of an output clock 22 generated by TAS 17. Switch 13 selects either the retrieved portion passed through D/A converter 19 or the input video signal passed over bypass line 12. Switch 13 could be a simple manual switch or an analog mux (multiplexer) automatically controlled by TAS 17 over an output select line (not shown) and is not a constraint on the present invention.

Figure 5:
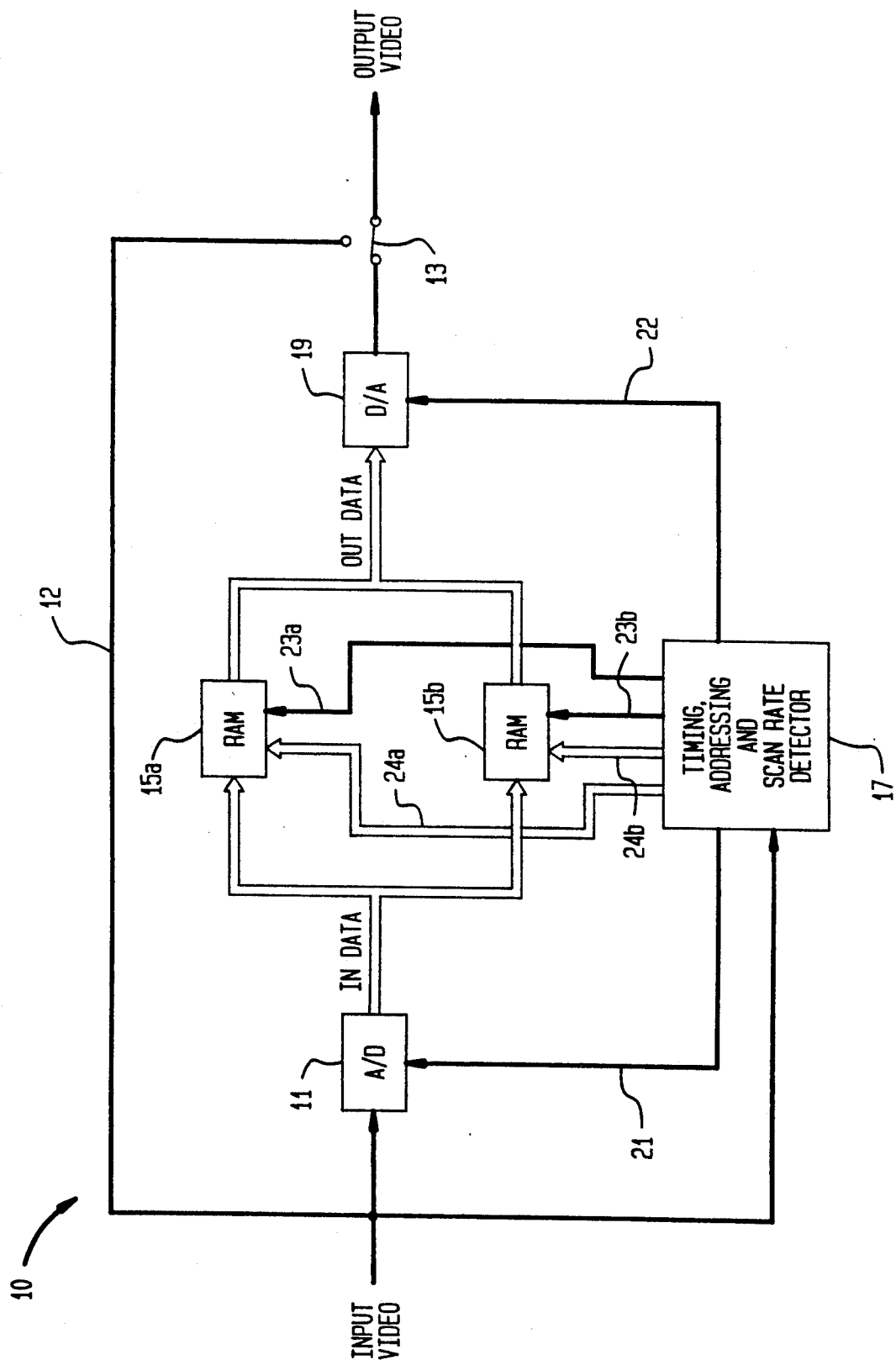
FIG. 5 is an alternative embodiment of the apparatus used to implement the method of the present invention.

Note that the retrieved portion is delayed by the time required to store and retrieve an entire video frame. For some time critical applications, however, this delay may be too long. Accordingly, an alternative apparatus that employs the features of the above described method is shown in FIG. 5. Common elements shared with the apparatus of FIG. 4 will share common reference numerals. In particular, 2 RAM's 15a and 15b are provided to swap between data storing and data retrieval modes. Clock signals passed over lines 23a and 23b, and address signals passed over lines 24a and 24b, are generated by TAS 17. A portion of each frame of the incoming video signal is first stored in RAM 15a. Then, as an identically sized, non-overlapping second portion of the same frame of the incoming video signal is stored in RAM 15b, data is retrieved from RAM 15a according to the vertical scan rate and reduced horizontal scan rate. The process is then alternated such that data from RAM 15b is retrieved while data is stored in RAM 15a.

In order to minimize the delay associated with the conversion process, each RAM 15a and 15b should store a minimal number of lines from each frame of the incoming video signal. This minimal number of lines is equal to the lowest common factor (other than one) of the input and output line rates. For the case at hand, this means that RAMs 15a and 15b each store 5 lines of the 875 line video frame. Thus, the delay is reduced to the time required to store and rescan only 5 lines of the 875 line video frame.

Figure 6:
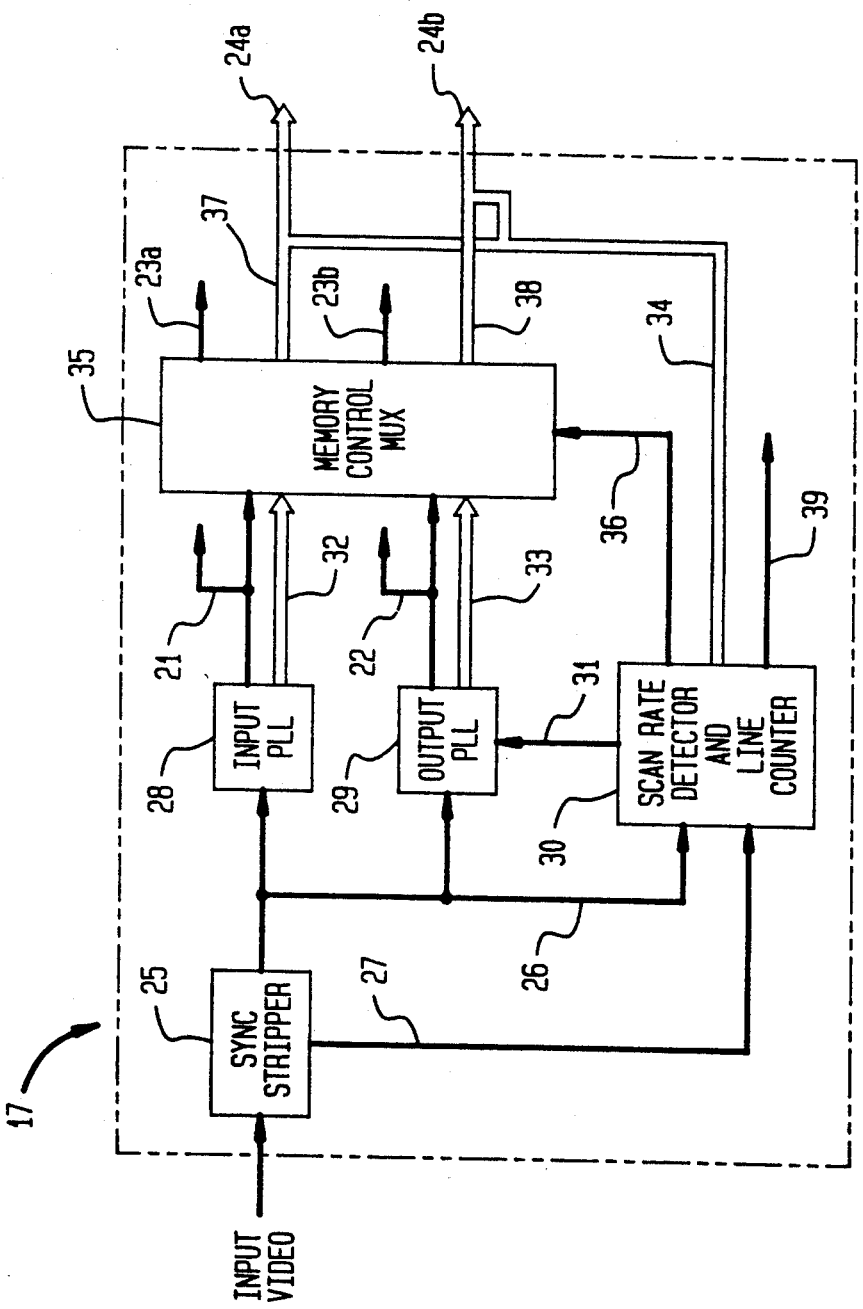
FIG. 6 is a more detailed view of the timing, addressing and scan rate detector means of FIG. 5.

As is readily apparent, TAS 17 processes the input video to generate all timing and address signals. While the above described functions of TAS 17 may be achieved by a variety of apparatus configurations, a preferred embodiment TAS 17, shown in FIG. 6, will now be described relative to the two RAM apparatus of FIG. 5. In particular, a sync stripper 25 extracts the horizontal sync 26 and the vertical sync 27 from the input video signal. An input phase lock loop (PLL) 28 multiplies the input horizontal sync rate by the sampling rate n for a line of video and generates the input clock 21 and an input column address 32. An output PLL 29 multiplies the horizontal sync rate by the ratio of the desired output line rate to the input line rate, or in this example, 525/875. Output PLL 29 then generates the output clock 22 and an output column address 33 based on the reduced horizontal sync rate. Thus, for the illustrated example, input PLL 28 would generate n unique addresses 5 times on a repetitive basis indicative of the 5 lines of the 875 line video stored in one of RAM's 15a or 15b. However, over the same time interval, output PLL 29 would generate the same n address pattern exactly 3 times indicative of the 3 lines of video generated from the 5 lines of 875 line video. A multiplication factor may be supplied to output PLL 29 over line 31 if it is desired to be able to convert more than one incoming line rate to the 525 line rate.

A scan rate detector and line counter (SRD/LC) 30 compares horizontal and vertical sync rates to determine the input video scan rate and generates the multiplication factor passed over line 31 if needed. Note that the scan rate could be output on a line 39 to control the operation of switch 13. The line counter portion of SRD/LC 30 counts the number of lines associated with the input video signal and generates a line address 34 common to both RAM's 15a and 15b. A memory input/output (I/O) select signal 36 is also generated for selecting input 21 and output 22 clocks and input column addresses 32 and output column addresses 33 via a memory control mux 35. Memory control mux 35 outputs clock signal 23a and column address 37 for RAM 15a, and clock signal 23b and column address 38 for RAM 15b. Column address 37 and line address 34 comprise address 24a while column address 38 and line address 34 comprise address 24b.

The advantages of the present invention are numerous. By retrieving a portion from each line of an input (higher resolution) video frame, conversion to an output (lower resolution) video frame is achieved while retaining the essence of the input (higher resolution) video frame since no lines are skipped. Furthermore, because the retrieved portion of the input video frame is based on the output line rate/input line rate ratio, the output video frame is equivalent to scanning the input video frame at the output video frame rate. Thus, the output video frame can display all of the information displayed by the input video frame with merely a lesser degree of resolution.

As pointed out above, implementation of the method can be achieved by a variety of means. Furthermore, the conversion method and apparatus can be adapted to receive a number of input line rates. For example, in the case of military aircraft, the input line rate could be based on a 675 or 875 line video frame. For a 675 line video frame, the output line rate/input line ratio is 7/9, while the same ratio for the 875 line video frame is 3/5. As mentioned above, there must be an integer number of n samples per line for both the input and output video frames to preclude any impact on the leading edge of the sync pulses. Also, there must be an equal number of samples per line stored for both input cases. Accordingly, a common denominator between 3/5 and 7/9 must be used to meet the above criteria. Therefore, any multiple of 45 samples per line may be used to convert both the 675 and 875 line video frame into the 525 line video frame. Naturally, this result can be carried further to adapt to any number of input line video frames.

Thus, although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. In a video system having a video signal operating at original vertical and original horizontal scan rates to generate a first video frame characterized by a first number of lines per frame, a method of converting the first video frame into a second video frame characterized by a second number of lines per frame, wherein the first number is greater than the second number, said method comprising the steps of:

alternately storing identically sized, non-overlapping first and second portions of the first video frame as digital samples in first and second memories, respectively, wherein each digital sample of the first and second portions has a line and column address to indicate a particular line and column within the first video frame based on the original vertical and original horizontal scan rates; and alternately retrieving, from the first and second memories, a portion of the stored digital samples from each line of the first video frame based on the original vertical scan rate and a reduced horizontal scan rate, wherein the reduced horizontal scan rate is a fraction of the original horizontal scan rate, the fraction being equal to the second number divided by the first number, wherein digital samples are: (1) retrieved from the first memory while being stored in the second memory, and (2) stored in the first memory while being retrieved from the second memory, whereby the retrieved portion from the first video frame is the second video frame.

2. A method according to claim 1 wherein said step of retrieving for each of the first and second portions of the video signal includes the steps of:
  initializing line and column address counters to 1;
  incrementing the column address counter according to the reduced horizontal scan rate; and
  incrementing the line address counter according to the original vertical scan rate.

3. A method according to claim 1 wherein a fixed number of digital samples are stored in each line and said step of retrieving for each of the first and second portions of the video signal includes the steps of:
  initializing line and column address counters to 1;
  incrementing the column address counter according to the reduced horizontal scan rate, wherein the column address counter continuously cycles from 1 to the fixed number; and
  incrementing the line address counter according to the original vertical scan rate and a fixed number of lines in the first and second portions, the fixed number of lines being identical for both the first and second portions, wherein the line address counter cycles from 1 to the fixed number of lines at the original vertical scan rate.

4. A method according to claim 1 wherein the fixed number is an integer whose value is greater than the number of pixels associated with the video signal.

5. A method according to claim 1 wherein each first and second portions of the first video frame comprises a number of lines, wherein the number of lines is equal to a lowest common factor, other than one, of the first and second number.

6. In a video system having a video signal operating at original vertical and original horizontal scan rates to generate a first video frame characterized by a first number of lines per frame, an apparatus for converting the first video frame into a second video frame characterized by a second number of lines per frame, wherein the first number is greater than the second number and said apparatus comprises
  means for sampling the video signal at a prescribed rate greater than the number of pixels associated with the video signal, said sampling means generating digital samples indicative of the first video frame;
  first memory means for storing a first portion of the digital samples, wherein each digital sample associated with the first portion has a line and column address to indicate a particular line and column within the first video frame based on the original vertical and original horizontal scan rates;
  second memory means for storing a second portion of the digital samples, wherein each digital sample associated with the second portion has a line and column address to indicate a particular line and column within the first video frame based on the original vertical and original horizontal scan rates and wherein said first and second portions are identically sized, non-overlapping portions of the first video frame;
  means for generating a retrieval address used in alternately retrieving from said first and second memory means, a portion of the stored digital samples from each line of the first video frame based on the original vertical scan rate and a reduced horizontal scan rate, wherein the reduced horizontal scan rate is a fraction percentage of the original horizontal scan rate, the fraction percentage being equal to the second number divided by the first number, whereby digital samples are: (1) retrieved from said first memory means while being stored in said second memory means, and (2) stored in said first memory means while being retrieved from said second memory means; and
  means for converting the retrieved portion of the digital samples from each line of the first video frame into the second video frame.

7. An apparatus as in claim 6 further comprising means for detecting a number of lines per frame associated with the video signal, wherein said converting apparatus is bypassed if the detected number of lines is equal to the second number.

8. An apparatus as in claim 7 wherein said detecting means comprises means for extracting vertical and composite sync pulses from the video signal, wherein the number of composite sync pulses between the vertical sync pulses is indicative of the detected number of lines per frame.

9. An apparatus as in claim 6 wherein said first and second memory means are both random access memories.

10. An apparatus as in claim 6 wherein said sampling means includes an analog-to-digital converter and said converting means includes a digital-to-analog converter.

11. A Video system having a video signal operating at original vertical and original horizontal scan rates to generate a first video frame characterized by a first number of lines per frame, a method of converting the first video frame into a second video frame characterized by a second number of lines per frame, wherein the first number is greater than the second number, said method comprising the steps of:
  storing the first video frame as digital samples, wherein a fixed number of digital samples are stored in each line, and wherein each digital sample has a line and column address to indicate a particular line and column within the first video frame based on the original vertical and original horizontal scan rates; and
  retrieving a portion of the stored digital samples from each line of the first video frame based on the original vertical scan rate and a reduced horizontal scan rate, the reduced horizontal scan rate being a fraction of the original horizontal scan rate, the fraction being equal to the second number divided by the first number, whereby the retrieved portion from the first video frame is the second video frame, said retrieving including the steps of:
  initializing line and column address counters to 1;
  incrementing the column address counter according to the reduced horizontal scan rate, wherein the column address counter continuously cycles from 1 to the fixed number; and
  incrementing the line address counter according the original vertical scan rate, wherein the line address counter cycles from 1 to the first number.

12. A method according to claim 11 wherein the fixed number is an integer whose value is greater than the number of pixels associated with the video signal.

* * * * *